US012472578B2

(12) United States Patent
Leitz et al.

(10) Patent No.: US 12,472,578 B2
(45) Date of Patent: *Nov. 18, 2025

(54) ADDITIVELY-MANUFACTURED REFRACTORY METAL COMPONENT, ADDITIVE MANUFACTURING PROCESS, AND POWDER

(71) Applicant: PLANSEE SE, Reutte (AT)

(72) Inventors: Karl-Heinz Leitz, Reutte (AT); Heinrich Kestler, Reutte (AT); Peter Singer, Reutte (AT); Gerhard Leichtfried, Innsbruck (AT); Jakob Braun, Innsbruck (AT); Lukas Kaserer, Innsbruck (AT); Janko Stajkovic, Innsbruck (AT)

(73) Assignee: Plansee SE, Reutte (AT)

( * ) Notice: Subject to any disclaimer, the term of this patent is extended or adjusted under 35 U.S.C. 154(b) by 600 days.

This patent is subject to a terminal disclaimer.

(21) Appl. No.: 17/294,845

(22) PCT Filed: Oct. 3, 2019

(86) PCT No.: PCT/AT2019/060326
§ 371 (c)(1),
(2) Date: May 18, 2021

(87) PCT Pub. No.: WO2020/102834
PCT Pub. Date: May 28, 2020

(65) Prior Publication Data
US 2022/0016699 A1     Jan. 20, 2022

(30) Foreign Application Priority Data
Nov. 19, 2018 (AT) .............................. A 50191/2018

(51) Int. Cl.
| C22C 32/00 | (2006.01) |
| B22F 1/12 | (2022.01) |
| B22F 10/28 | (2021.01) |
| B22F 10/34 | (2021.01) |
| B22F 12/41 | (2021.01) |
| B23K 15/00 | (2006.01) |
| B33Y 10/00 | (2015.01) |
| B33Y 70/00 | (2020.01) |

(52) U.S. Cl.
CPC ............ *B23K 15/0086* (2013.01); *B22F 1/12* (2022.01); *B22F 10/28* (2021.01); *B22F 10/34* (2021.01); *B22F 12/41* (2021.01); *B33Y 10/00* (2014.12); *B33Y 70/00* (2014.12); *C22C 32/0031* (2013.01); *C22C 32/0047* (2013.01); *B22F 2207/13* (2013.01); *B22F 2301/20* (2013.01); *B22F 2304/10* (2013.01)

(58) Field of Classification Search
None
See application file for complete search history.

(56) References Cited

U.S. PATENT DOCUMENTS

| 6,589,368 | B1* | 7/2003 | Takada ................... C22C 27/04 148/423 |
| 7,806,995 | B2 | 10/2010 | Jehanno |
| 10,415,141 | B2 | 9/2019 | O'Sullivan et al. |
| 10,641,045 | B2 | 5/2020 | Cook, III et al. |
| 10,710,157 | B2 | 7/2020 | Ibe et al. |
| 2008/0017278 | A1* | 1/2008 | Nagae ................. C22C 32/0005 148/237 |
| 2009/0260299 | A1* | 10/2009 | Liu ........................ C22C 26/00 51/309 |
| 2014/0141281 | A1 | 5/2014 | Kadokura et al. |
| 2017/0037518 | A1 | 2/2017 | Oxford et al. |
| 2017/0183780 | A1 | 6/2017 | O'Sullivan et al. |
| 2017/0189960 | A1 | 7/2017 | Ibe |
| 2017/0189962 | A1 | 7/2017 | Kestler et al. |
| 2018/0214949 | A1 | 8/2018 | Martin et al. |
| 2019/0143412 | A1 | 5/2019 | Buller et al. |
| 2019/0375072 | A1 | 12/2019 | Rifaut et al. |
| 2021/0002744 | A1 | 1/2021 | Martin et al. |
| 2021/0069781 | A1 | 3/2021 | Mizobe et al. |
| 2022/0134421 | A1 | 5/2022 | Valls Angles |

FOREIGN PATENT DOCUMENTS

| CN | 1852999 A | 10/2006 |
| CN | 103074532 A | 5/2013 |
| CN | 106536095 A | 3/2017 |
| CN | 107245621 A | 10/2017 |

(Continued)

OTHER PUBLICATIONS

English translation of CN 108149103 (originally published Jun. 12, 2018), obtained from PE2E search.*
Wang et al.: "Dense Pure Tungsten Fabricated by Selective Laser Melting", Applied Sciences 2017, 7, 430, DOI:10.3390/app7040430.
Faidel et al.: "Investigation of the selective laser melting process with molybdenum powder", Additive Manufacturing, 8, 2015, 88-94.
Gu et al.: "Selective Laser Melting Additive Manufacturing of Hard-to-Process Tungsten-Based Alloy Parts With Novel Crystalline Growth Morphology and Enhanced Performance", Journal of Manufacturing Science and Engineering, Aug. 2016, vol. 138 / 081003-1.
Makineni et al. "Synthesis and stabilization of a new phase regime in a Mo—Si—B based alloy by laser-based additive manufacturing", Acta Materialia, 151 (2018) 31-40.

(Continued)

*Primary Examiner* — George Wyszomierski
(74) *Attorney, Agent, or Firm* — Laurence A. Greenberg; Werner H. Stemer; Ralph E. Locher

(57) ABSTRACT

A component has a matrix phase composed of at least one material selected from the group molybdenum, a molybdenum-based alloy, tungsten, a tungsten-based alloy and a molybdenum-tungsten-based alloy. The component is manufactured using a laser or electron beam in an additive manufacturing process. The molybdenum content, the tungsten content or the total content of molybdenum and tungsten is more than 85 at %, and the component contains particulates having a melting point above the melting point of the matrix phase.

13 Claims, No Drawings

(56) References Cited

FOREIGN PATENT DOCUMENTS

| | | | |
|---|---|---|---|
| CN | 108149103 A | * | 6/2018 |
| DE | 102010049910 A1 | | 5/2012 |
| EP | 3208077 A1 | | 8/2017 |
| EP | 3395782 A1 | | 10/2018 |
| JP | S63169341 A | | 7/1988 |
| JP | 2002226926 A | | 8/2002 |
| JP | 2017531736 A | | 10/2017 |
| JP | 2018154925 A | | 4/2018 |
| KR | 20180109851 A | | 10/2018 |
| WO | 2012055398 A1 | | 5/2012 |
| WO | 2016000004 A2 | | 1/2016 |
| WO | 2016171711 A1 | | 10/2016 |
| WO | 2018144323 A1 | | 8/2018 |
| WO | 2018160297 A1 | | 9/2018 |
| WO | WO-2019/133749 A1 | * | 7/2019 |
| WO | 2019230806 A1 | | 12/2019 |

OTHER PUBLICATIONS

Braun et al.: "Molybdenum and tungsten manufactured by selective laser melting: Analysis of defect structure and solidification mechanisms", International Journal of Refractory Metals & Hard Materials 84 (2019) 104999.

Leitz et al.: "Additive Manufacturing of Pore and Crack Free Molybdenum and Tungsten by Selective Laser Melting", Euro PM 2019—AM Refractory & Heavy Metals, Manuscript refereed by Dr.-Ing. Thomas Weissgaerber (Fraunhofer IFAM, Germany).

Kaserer et al.: "Fully dense and crack free molybdenum manufactured by Selective Laser Melting through alloying with carbon", International Journal of Refractory Metals & Hard Materials 84 (2019) 105000.

Lukas Kaserer et al.: "Comparison of different alloying concepts for Mo for improving component strength and quality in LPBF", Conference paper, Euro PM2023 Congress & Exhibition, Oct. 1-4, 2023, Lisbon.

* cited by examiner

ADDITIVELY-MANUFACTURED REFRACTORY METAL COMPONENT, ADDITIVE MANUFACTURING PROCESS, AND POWDER

BACKGROUND OF THE INVENTION

Field of the Invention

The invention relates to a component having a matrix phase composed of at least one material selected from the group comprising molybdenum, a molybdenum-based alloy, tungsten, a tungsten-based alloy, and a molybdenum-tungsten-based alloy and manufactured using a laser or electron beam in an additive manufacturing process, wherein the molybdenum content, the tungsten content or the total content of molybdenum and tungsten is more than 85 at %. The invention also relates to an additive manufacturing process for producing a component with at least the steps of: providing a starting powder composed of at least one material selected from a group comprising molybdenum, a molybdenum-based alloy, tungsten, a tungsten-based alloy and a molybdenum-tungsten-based alloy; and layerwise fusing of the particles of the starting powder using a laser or electron beam to form a matrix phase, wherein the molybdenum content, the tungsten content or the total content of molybdenum and tungsten in the matrix phase is more than 85 at %. Finally, the invention relates and to a use of a powder for an additive manufacturing process.

Due to their high melting point, low coefficient of thermal expansion and high thermal conductivity, tungsten, molybdenum and alloys thereof are used for various high-performance applications, for example X-ray anodes, heat sinks, high-temperature heating zones, thrusters, extrusion dies, mold parts for injection molding, hot runner nozzles, resistance welding electrodes or components for ion implantation systems. These elements moreover have a high density, thus ensuring good shielding behavior with respect to electromagnetic and particle radiation. As a result of the comparatively low ductility at room temperature and the high DBTT (ductile-brittle transition temperature) the processing characteristics are disadvantageous for both machining and forming processes. Furthermore, with the exception of molybdenum-rhenium and tungsten-rhenium the weldability of these materials is poor. A large industrial-scale process for producing components from these materials is the powder metallurgical production route in which the corresponding starting powders are pressed and sintered and generally subsequently subjected to forming at high temperature (temperature above DBTT).

The possibilities for geometric component design achievable with additive manufacturing processes far exceed those of conventional processes. Especially for materials such as molybdenum, tungsten and alloys thereof additive manufacturing processes are especially advantageous since compared to other metallic materials these materials are markedly more difficult to process with commonly used conventional manufacturing methods. Additive manufacturing of metallic materials usually employs powder, and less commonly also wires, as a starting material. Metallic materials have seen the establishment of several processes, such as selective laser sintering (SLS), in which powder applied layerwise is locally sintered using a laser beam, selective laser beam melting (SLM) and selective electron beam melting (SEBM), in which powder applied layerwise is locally melted, and laser metal deposition (LMD), in which a powder supplied via a nozzle is melted.

Additive manufacturing processes do not require machining or forming tools, thus allowing cost-efficient manufacturing of components in a low number of units. They moreover achieve high resource efficiency since powder particles that have not been fused or sintered together may be reused. However, the disadvantage of these processes remains the very low build rate.

It must moreover be taken into account in beam-based additive manufacturing processes that compared to conventional consolidation processes, such as casting or sintering, other metal-physical mechanisms are in effect. While it is surface and boundary grain diffusion that determine densification in the case of sintering, the mechanisms of action in processes comprising local melting and solidification at high cooling rate, such as SLM, SEBM and LMD, are different, much more complex and also not yet completely understood. Mention should be made here of wetting characteristics, Marangoni convection, recoil effects as a result of evaporation, segregation, epitaxial grain growth, solidification time, heat flow, heat flow direction and internal stresses as a result of solidification shrinkage. Material concepts that are successful in conventional processes usually do not lead to defect-free components in beam-based additive processes.

Production of pure tungsten by selective laser melting is described in a journal article by Dianzheng Wang et al. (Appl. Sci. 2007, 7, 430) and production of molybdenum by selective laser melting in a journal article by D. Faidel et al. (Additive Manufacturing 8 (2015) 88-94). WO 2012/055398 discloses a selective laser beam melting process for refractory metals, wherein the composition of the material can be altered by reaction with a reactive gas present in the atmosphere during construction of the component. The specification CN103074532 A and the accompanying journal article "Selective Laser Melting Additive Manufacturing of Hard-to-Process Tungsten-Based Alloy Parts With Novel Crystalline Growth Morphology and Enhanced Performance", Journal of Manufacturing Science and Engineering, August 2016, Vol. 138, 081003, by Dongdong Gu et al., describes laser melting of mechanically alloyed tungsten-TiC powder. S. K. Makineni et al. describe in "Synthesis and stabilization of a new phase regime in a Mo—Si—B based alloy by laser-based additive manufacturing", Acta Materialia 151 (2018), 31 40 the production of a molybdenum-based alloy using grain-refining lanthanum oxide nanoparticles.

US 2018/0214949 A1 and WO 2018/144323 disclose the use of grain-refining nanoparticles for the production of powders for additive manufacturing containing particles composed of an aluminum alloy.

The most widespread additive manufacturing process is the selective laser beam melting process (SLM). This comprises using a coating bar to apply a powder layer to a substrate. A laser beam is then passed over this powder layer. Said beam effects local melting of the powder particles, thus causing the individual powder particles to fuse to one another and to the previously applied layer. A layer of the component to be manufactured is thus formed through successive local melting of powder particles and subsequent solidification. A further powder layer is then applied to the previously processed powder layer and the process recommences. The component is thus further constructed with each new powder layer, wherein the build direction is perpendicular to the respective planes of the powder layers. Since the additive manufacturing process results in a characteristic microstructure those skilled in the art can discern whether a component has been produced by a conventional process or by an additive manufacturing process.

Molybdenum and tungsten have a high melting point, a high thermal conductivity in the solid phase and a high surface tension and viscosity in the liquid phase. These materials are among the most difficult materials to process using an additive manufacturing process. The short time in the molten phase caused by the high thermal conductivity, combined with the high surface tension and high viscosity, favors the balling effect, which in turn leads to pores and thus crack-inducing defects and a low density. The balling effect also has an adverse effect on surface quality, specifically on surface roughness. Since molybdenum and tungsten have a very low fracture toughness, local defects combined with the internal thermally induced stresses that are inherent to the process lead to cracks.

Components made of molybdenum and tungsten produced by selective laser or electron beam melting show a columnar crystalline structure, wherein the average grain aspect ratio (GAR; ratio of grain length to grain width) in the build direction is typically greater than 8. An intercrystalline network of cracks, which reproduces the melting trace of the laser/electron beam, is formed in the plane perpendicular to the build direction. The cracks are predominantly intercrystalline hot and cold cracks. Said cracks are partially interconnected with the result that components often exhibit open porosity and are not gas- and liquid-tight. Stress resulting in fracture of the component generally does not result in plastic deformation and predominantly intercrystalline fracture behavior is observed. Intercrystalline fracture behavior is understood as meaning a fracture caused predominantly by cracks along the grain boundaries. As a result of this fracture behavior components produced in this way exhibit low fracture resistance, low fracture toughness and low ductility.

SUMMARY OF THE INVENTION

It is an object of the invention to provide
- a component of the type in question, wherein the molybdenum content, the tungsten content or the total content of molybdenum and tungsten is more than 85 at %, for which the problems discussed hereinabove are avoided
- an additive manufacturing process of the type in question for reliable production of a component having the abovementioned properties using a starting powder, wherein the molybdenum content, the tungsten content or the total content of molybdenum and tungsten is more than 85 at %
- and a powder which exhibits optimized behavior for use in an additive manufacturing process, wherein the powder comprises particles composed of at least one material selected from a group comprising molybdenum, a molybdenum-based alloy, tungsten, a tungsten-based alloy and a molybdenum-tungsten-based alloy, wherein the particles comprise a matrix phase and wherein the molybdenum content, the tungsten content or the total content of molybdenum and tungsten is more than 85 at %.

It is a particular object of the invention to provide a component having the following properties:
- reduced defect frequency, in particular crack frequency
- improved strength
- improved fracture toughness
- improved ductility
- improved density The object is achieved by a component having the features as claimed, an additive manufacturing process having the features as claimed and a use of a powder having the features as claimed. Advantageous embodiments of the invention are defined in the dependent claims.

In the present disclosure a powder is to be understood as meaning an accumulation of particles. The particulates may be present for example as a volume constituent of particles of the powder (specifically for example in the form of precipitations), as particulates adhering to the surface of particles of the powder or as constituents of the powder existing separately from the particles.

A molybdenum-based alloy is to be understood as meaning an alloy containing at least 50 at % of molybdenum. A molybdenum-based alloy for use in the invention comprises at least 85, 90, 95 or 99 at % of molybdenum. A tungsten-based alloy contains at least 50 at % of tungsten. A tungsten-based alloy for use in the invention comprises at least 85, 90, 95 or 99 at % of tungsten. A molybdenum-tungsten alloy is to be understood as meaning an alloy which comprises a sum total of at least 50 at % of molybdenum and tungsten, in particular a sum total of at least 80, 90, 95 or 99 at % of molybdenum and tungsten. Molybdenum-tungsten alloys are a preferred embodiment in all concentration ranges.

Components made of molybdenum, tungsten, molybdenum-based and tungsten-based alloys produced via beam-based additive manufacturing processes typically have an oxygen content between 0.25 and 0.6 at %. When using mechanically alloyed starting powders markedly higher oxygen contents of 2 at % or more can also occur. The additive manufacturing process, for example selective laser or electron beam melting, does not reduce the oxygen content. When using high-resolution examination methods such as scanning or transmission electron microscopy it is apparent that in prior art components the oxygen is predominantly precipitated at the grain boundaries in the form of molybdenum/tungsten oxide. These precipitations are responsible for the intercrystalline fracture behavior with consequently low fracture resistance and toughness of additively manufactured components made of molybdenum, tungsten and alloys thereof. The high oxygen content can result in both hot and cold cracks. Hot cracks are formed during production as a result of reduced grain boundary strength. In the present case grain boundary strength is adversely affected by the melting of the oxides precipitated at the grain boundaries in the heat-influenced zone of the melting trace. Cold cracks are attributable to thermally induced stresses in combination with defects (pores, microcracks) which act as crack nuclei. When grain boundary strength is markedly lower than the strength in the grain interior, as is the case in the prior art, intercrystalline cracking occurs.

A high oxygen content additionally amplifies the balling effect. The oxygen accumulates in the edge region of the melting zone and reduces surface tension there. Marangoni convection thus promotes a material flow from the edge region into the center of the melting zone, as a result of which the balling caused by the Plateau-Rayleigh instability is even more markedly amplified.

The basic concept of the invention is that of using particulates which have a melting point above the melting point of the matrix phase and can therefore function as crystallization nuclei for the molten matrix phase to achieve a fine-grained microstructure of the component. In the case of a fine-grained microstructure the total area of grain boundary in the component is greater than in the case of a coarse-grained microstructure and the oxides formed with the molybdenum/tungsten are therefore distributed over a larger area without the oxygen content of the component needing to be reduced. This makes it possible to avoid a weakening of the grain boundaries. A fine-grained microstructure moreover increases toughness.

It is in principle also possible to establish grain refining through constitutional supercooling. However, high contents of alloying elements effecting constitutional supercooling are required to achieve a sufficient effectiveness. These high contents bring about an increase in strength, for example through solid solution formation or precipitations, thus markedly reducing ductility expressed for example as fracture toughness. The providing of particulates having a melting point above the melting point of the matrix phase according to the invention makes it possible to achieve a grain-refining effect without constitutional supercooling or with a lower content of alloying elements effecting constitutional supercooling.

A component according to the invention has the feature that the component contains particulates having a melting point above the melting point of the matrix phase. As described hereinabove these particulates result in a fine-grained microstructure in the component and are thus strength and toughness enhancing.

The employed material from which the component is manufactured is preferably a powder.

The presence of the particulates is demonstrated using customary metallographic processes, for example by scanning or transmission electron microscopy.

An additive manufacturing process according to the invention has the feature that the starting powder
  contains particulates having a melting point above the melting point of the matrix phase and/or
  contains at least one precursor substance (for example zirconium, hafnium, tantalum, titanium, niobium, vanadium) for particulates, wherein the melting point of the particulates is above the melting point of the matrix phase and the particulates composed of the precursor substance are formed during layerwise fusing of the particles of the starting powder using a laser or electron beam
  contains at least one component (for example zirconium, hafnium, tantalum, titanium, niobium, vanadium) which in reaction with at least one component of a process gas atmosphere (for example nitrogen) during layerwise fusing of the particles of the starting powder using a laser or electron beam forms particulates having a melting point above the melting point of the matrix phase It is preferably provided that the step of providing a starting powder comprises a spheroidizing in the melt phase and/or a pelletizing of a raw powder.

All additive manufacturing processes known according to the prior art, in particular those in which a multiplicity of individual powder particles are fused together to form a solid structure by a high-energy beam (laser or electron beam), may be used in the invention.

A powder for a use according to the invention in an additive manufacturing process, in particular an additive manufacturing process according to the invention, has the feature that the powder
  contains particulates having a melting point above the melting point of the matrix phase of the particles and/or
  contains at least one precursor substance for particulates, wherein the melting point of the particulates is above the melting point of the matrix phase of the particles and the particulates composed of the precursor substance are formed during a layerwise fusing of the particles of the starting powder using a laser or electron beam It is preferable when the individual powder particles are melted by means of an additive manufacturing process, it being advantageous to use SLM (selective laser beam melting) or SEBM (selective electron beam melting).

The component is preferably constructed layerwise. For example, a powder layer is applied to a baseplate by means of a coating bar. The powder layer generally has a height of 10 to 150 μm.

In SEBM, a defocused electron beam is initially used to sinter the powder particles to one another so as to render them conductive. The powder is then locally melted by introduction of energy by electron beam. SLM allows direct local melting of the powder by means of a laser beam.

The beam generates a linear melt bath having a line width of typically 30 micrometers to 200 micrometers. The laser or electron beam is guided over the powder layer. By suitable beam guiding the entire powder layer or else just part of the powder layer can be melted and subsequently solidified. The melted and solidified regions of the powder layer are part of the finished component. The unmelted powder is not a constituent of the produced component. Subsequently, a further powder layer is applied by coating bar and the laser or electron beam is again guided over this powder layer. This results in a layerwise construction and a characteristic component structure. The guiding of the electron or laser beam results in formation of a so-called scan structure in each powder layer. In addition, a typical layer structure is likewise formed in the build direction which is determined by the application of a new powder layer. Both the scan structure and the individual layers are apparent in the finished component.

The microstructure of powder particles fused selectively to form a solid structure by means of a high-energy beam (preferably a laser beam or electron beam) via an additive manufacturing process differs distinctly from a microstructure produced by means of other processes, for example thermal spraying. Thus thermal spraying comprises accelerating individual spray particles in a gas stream and flinging them onto the surface of the component to be coated. The spray particles may be in the fully or partially melted form (plasma spraying) or solid form (cold gas spraying). Layer formation occurs since the individual spray particles flatten upon impacting the component surface, adhere primarily through mechanical interaction and effect layerwise construction of the spray layer. A sheetlike layer structure is thus formed. Layers produced in such a way exhibit in a plane parallel to the build direction a grain extent perpendicular to the build direction having an average grain aspect ratio (GAR; ratio of grain length to grain width) well above 2 and thus differ distinctly from layers/components produced by selective laser or electron beam melting which in a plane parallel to the build direction likewise have an average grain aspect ratio well above 2 in a plane parallel to the build direction, but with a grain extent parallel to the build direction.

In one exemplary embodiment of a component according to the invention it is provided that the content of the particulates in the component is sufficiently high that the matrix phase has an average grain area of less than 10 000 micrometers squared, preferably less than 5000 micrometers squared, particularly preferably less than 2500 micrometers squared.

In one exemplary embodiment of a component according to the invention and/or the manufacturing process according to the invention and/or the use according to the invention it is provided that an average size of the particulates is less than 5 micrometers, preferably less than 1 micrometer. The average size of the particulates is preferably more than 10 nm.

In one exemplary embodiment of a component according to the invention and/or of the manufacturing process according to the invention it is provided that a volume content of the particulates in the component is between 0.05 vol % and 10 vol %. Below 0.05 vol % the grain-refining effect is insufficient and above 10 vol % the particulate number/volume (responsible for the grain size established) increases only slightly, so that higher volume contents than 10 vol % essentially achieve only coarsening of the particulates and not a further reduction in grain size. However, these higher volume contents lead to a loss of ductility.

The volume content may be measured in various ways including for example the following:
- determining the composition of the particulates and any dissolved proportions of the elements forming the particulates by suitable analytical methods such as XRD, SEM/EDX, TEM/EDX, microprobe
- determining the total content of the elements forming the particulates by suitable methods such as ICP-OES, ICP-MS or XRF
- calculating the particulate content (dissolved proportions of the elements forming the particulates are not taken into account)

In one exemplary embodiment of a component according to the invention it is provided that at least in one fracture plane the component exhibits a fracture behavior having a transcrystalline proportion of more than 50%, preferably of more than 80%, particularly preferably of more than 90%, of the fracture area.

In one exemplary embodiment of a component according to the invention it is provided that the component is manufactured layerwise in a build direction and preferably has an average grain extent in a plane parallel to the build direction of less than 5, preferably less than 3. The low grain extent ensures an isotropy of mechanical properties sufficient for the typically required performance characteristics.

In one exemplary embodiment of a component according to the invention and/or of an additive manufacturing process according to the invention and/or of the use of a powder according to the invention it is provided that the particulates are individually or in any desired combination selected from a group comprising:
- oxides, preferably $ZrO_2$
- carbides, preferably ZrC, NbC, MoC, TiC, TaC, HfC
- nitrides, preferably YN, TaN, HfN
- borides, preferably $TaB_2$, $HfB_2$ The type of particulates preferably employed depends on what the matrix phase of the component is composed of. It is important to ensure that the melting point of the particulates is above the melting point of the matrix phase of the component.

The melting temperatures of the abovementioned compounds:
YN ($T_m$=2670° C.), MOC ($T_m$=2687° C.), $ZrO_2$ ($T_m$=2715° C.), Ta ($T_m$=2996° C.), TaN ($T_m$=3090° C.), $TaB_2$ ($T_m$=3140° C.), TiC ($T_m$=3160° C.), Re ($T_m$=3180° C.), $HfB_2$ ($T_m$=3250° C.), HfN ($T_m$=3305° C.), TaC ($T_m$=3880° C.), HfC ($T_m$=3900° C.), ZrC ($T_m$=3540° C.), NbC ($T_m$=3500° C.)
are above the melting temperature of molybdenum ($T_m$=2623° C.) and in some cases above that of tungsten ($T_m$=3422° C.).

Having regard to the use according to the invention of a powder it is preferably provided that the powder has a particle size of less than 100 micrometers.

Having regard to the use according to the invention of a powder it is provided in one exemplary embodiment that the particles of the powder comprise the particulates, preferably in the form of fine precipitations. This has the advantage that application of the powder layer with the coating bar cannot result in deleterious demixing.

Having regard to the use according to the invention of a powder it is provided in one exemplary embodiment that the powder is a mixture containing particles containing molybdenum and/or tungsten and particulates having a melting point above the melting point of the matrix phase. The advantage here is the ready availability of the starting materials.

Having regard to the use according to the invention of a powder it is provided in one exemplary embodiment that the at least one precursor substance for the particulates having a melting point above the melting point of the matrix phase is at least partially in the form of a layer on particles of the powder.

In one exemplary embodiment of the component according to the invention it is provided that the component comprises one or more alloying elements which at least in the temperature range ≥1500° C. has/have a reducing effect
- in the case of molybdenum and the molybdenum-based alloy for $MoO_2$ and/or $MoO_3$,
- in the case of tungsten and the tungsten-based alloy for $WO_2$ and/or $WO_3$ and
- in the case of the molybdenum-tungsten-based alloy for at least one oxide from the group of $MoO_2$, $MoO_3$, $WO_2$ and $WO_3$,
- wherein at least one of the alloying elements is present both in at least partially unoxidized form and in oxidized form.

In one exemplary embodiment of an additive manufacturing process according to the invention it is provided that the provided starting powder comprises at least one element which at least in the temperature range ≥1500° C. has a reducing effect in the case of molybdenum and the molybdenum-based alloy for $MoO_2$ and/or $MoO_3$, in the case of tungsten and the tungsten-based alloy for $WO_2$ and/or $WO_3$ and in the case of the molybdenum-tungsten-based alloy for at least one oxide from the group of $MoO_2$, $MoO_3$, $WO_2$ and $WO_3$ and is present in the provided starting powder in at least partially unoxidized form and that in the produced component at least one of the reducing elements is at least partially in the form of oxide.

In one exemplary embodiment of a powder according to the invention it is provided that the powder further comprises one or more elements which at least in the temperature range ≥1500° C. has/have a reducing effect in the case of molybdenum and the molybdenum-based alloy for $MoO_2$ and/or $MoO_3$, in the case of tungsten and the tungsten-based alloy for $WO_2$ and/or $WO_3$ and in the case of the molybdenum-tungsten-based alloy for at least one oxide from the group of $MoO_2$, $MoO_3$, $WO_2$ and $WO_3$ and that at least one reducing element is present in at least partially unoxidized form.

The measures described hereinabove make it possible to reduce the formation of molybdenum/tungsten oxides, in particular at the grain boundaries, by providing the oxygen with a more attractive reaction partner in the form of the at least one alloying element having a reducing effect/reducing element. Accordingly the oxygen content of the component is not reduced but rather the oxygen is at least partially, preferably largely, present in the form of a solid oxide formed (at room temperature) with the alloying element(s). The oxygen bound in this way can no longer have an adverse effect on grain boundary strength.

Suitable alloying elements having a reducing effect/reducing elements may easily be found in tables by those skilled in the art.

The Gibbs energy (free enthalpy) or the Richardson-Ellingham diagram may be used to find the elements having a reducing effect on molybdenum/tungsten oxide on the basis of the differences between their standard free enthalpies of formation. This makes it possible in simple fashion to find elements suitable as a reducing agent for molybdenum/tungsten oxide. The alloying element preferably has a reducing effect for all molybdenum oxides (for example $MoO_2$, $MoO_3$) and/or for all tungsten oxides (for example $WO_2$, $WO_3$) independently of their stoichiometry. In order for the alloying element to be able to reliably bind the oxygen in the form of an oxide the alloying element must have a reducing effect for molybdenum and/or tungsten oxide at least in the temperature range ≥1500° C. At temperatures <1500° C. the reaction kinetics are too low and sufficient back-oxidation of molybdenum/tungsten thus no longer occurs. The alloying element preferably has a reducing effect for molybdenum and/or tungsten oxide in the temperature range room temperature to liquidus temperature.

It is preferably provided that at least one of the alloying elements is an element of group 2, 3 or 4 of the periodic table, preferably titanium, zirconium or hafnium. For example it may be provided that the component contains HfC, $ZrO_2$ or $HfO_2$.

The presence of the alloying element in the component in at least partially unoxidized form and in oxidized form may be demonstrated by customary methods, for example XRD, microprobe, ICP-OES, ICP-MS, XRF, SEM/EDX, TEM/EDX and carrier gas hot extraction. Quantitative determination of the alloying element content is carried out for example via ICP-OES or ICP-MS and quantitative determination of the oxygen content by carrier gas hot extraction or XRF. Whether the alloy element is present in both oxidized and non-oxidized form can be determined by XRD and at low contents by spatially resolving methods, for example microprobe, SEM/EDX or TEM/EDX.

It may preferably be provided that the particulates having a melting point above the melting point of the matrix phase themselves function as these alloying elements/reducing elements, i.e. assume a dual role.

The invention claimed is:

1. A component, comprising:
 a matrix phase composed of at least one material selected from the group consisting of molybdenum, a molybdenum-based alloy, tungsten, a tungsten-based alloy, and a molybdenum-tungsten-based alloy, the component having been manufactured using a laser or electron beam in an additive manufacturing process, the component being formed from powder particles fused selectively by said laser or electron beam to form a solid structure;
 a molybdenum content, a tungsten content, or a total content of molybdenum and tungsten being greater than 85 at %;
 particulates contained in the component having a melting point above a melting point of the matrix phase, said particulates configured to function as crystallization nuclei for a molten matrix phase to achieve a fine-grained microstructure of the component; and
 the component having been manufactured in a build direction in the additive manufacturing process and, in a plane parallel to the build direction, a grain extent parallel to the build direction has an average grain aspect ratio of more than 2 and less than 5.

2. The component according to claim 1, wherein a content of the particulates in the component produces an average grain area in the matrix phase of less than 10,000 μm² (micrometers squared).

3. The component according to claim 2, wherein the average grain surface area in the matrix phase is less than 2500 μm².

4. The component according to claim 1, wherein an average particulate size of the particulates is less than 5 μm.

5. The component according to claim 1, wherein a volume content of the particulates in the component is between 0.05 vol % and 10 vol %.

6. The component according to claim 1, wherein at least in one fracture plane the component exhibits a fracture behavior having a transcrystalline proportion of more than 50% of a fracture area.

7. The component according to claim 1, wherein the particulates are individually or in combination selected from the group consisting of:
 $ZrO_2$, $HfO_2$,
 ZrC, NbC, MoC, TiC, TaC, HfC,
 YN, TaN, HfN, and
 $TaB_2$, $HfB_2$.

8. The component according to claim 1, which comprises one or more alloying elements which, at least in a temperature range ≥1500° C., have a reducing effect for the following:
 in the case of molybdenum and the molybdenum-based alloy, for $MoO_2$ and/or $MoO_3$;
 in the case of tungsten and the tungsten-based alloy, for $WO_2$ and/or $WO_3$; and
 in the case of the molybdenum-tungsten-based alloy, for at least one oxide selected from the group consisting of $MoO_2$, $MoO_3$, $WO_2$ and $WO_3$; and
 wherein at least one of the alloying elements is present both in at least partially unoxidized form and in oxidized form.

9. An additive manufacturing process for producing a component, the method comprising:
 providing a starting powder with particles composed of at least one material selected from the group consisting of molybdenum, a molybdenum-based alloy, tungsten, a tungsten-based alloy, and a molybdenum-tungsten-based alloy;
 providing the starting powder with at least one of the following:
  particulates having a melting point above a melting point of a matrix phase of the component, the particulates configured to function as crystallization nuclei for a molten matrix phase to achieve a fine-grained microstructure of the component;
  at least one precursor substance for particulates, wherein the melting point of the particulates lies above the melting point of the matrix phase and the particulates composed of the at least one precursor substance are formed during layer-wise fusing of the particles of the starting powder using a laser or electron beam, the component being formed from powder particles fused selectively by the laser or electron beam to form a solid structure;
  at least one component which in reaction with at least one component of a process gas atmosphere during layer-wise fusing of the particles of the starting powder using a laser or electron beam forms particulates having a melting point above the melting point of the matrix phase;

layer-wise fusing the particles of the starting powder with a laser or electron beam to form the component with a matrix phase having a molybdenum content, a tungsten content or a total content of molybdenum and tungsten greater than 85 at %; and manufacturing the component in a build direction in the additive manufacturing process and, in a plane parallel to the build direction, a grain extent parallel to the build direction having an average grain aspect ratio of more than 2 and less than 5.

10. The manufacturing process according to claim 9, wherein the step of providing the starting powder comprises spheroidizing the particles in the melt phase and/or pelletizing a raw powder.

11. The manufacturing process according to claim 9, wherein an average size of the particulates is less than 5 µm.

12. The manufacturing process according to claim 9, which comprises forming the component with a volume content of the particulates in the component between 0.05 vol % and 10 vol %.

13. The manufacturing process according to claim 9, wherein the starting powder comprises at least one reducing element which, at least in a temperature range ≥1500° C., has a reducing effect, in the case of molybdenum and the molybdenum-based alloy for $MoO_2$ and/or $MoO_3$, in the case of tungsten and the tungsten-based alloy for $WO_2$ and/or $WO_3$, and in the case of the molybdenum-tungsten-based alloy for at least one oxide from the group of $MoO_2$, $MoO_3$, $WO_2$ and $WO_3$ and the reducing element is present in the starting powder in at least partially unoxidized form and the component is produced to have at least one of the reducing elements at least partially in the form of oxide.

* * * * *